(12) United States Patent
Seipold et al.

(10) Patent No.: US 9,586,292 B2
(45) Date of Patent: Mar. 7, 2017

(54) WELDING OF ALUMINIZED COMPONENTS AND AN ALUMINIZED COMPONENT

(71) Applicant: SIEMENS AKTIENGESELLSCHAFT, München (DE)

(72) Inventors: Frank Seipold, Berlin (DE); Kathrin Sperlich, Berlin (DE)

(73) Assignee: SIEMENS AKTIENGESELLSCHAFT (DE)

(*) Notice: Subject to any disclaimer, the term of this patent is extended or adjusted under 35 U.S.C. 154(b) by 0 days.

(21) Appl. No.: 14/888,461

(22) PCT Filed: Apr. 22, 2014

(86) PCT No.: PCT/EP2014/058064
§ 371 (c)(1),
(2) Date: Nov. 2, 2015

(87) PCT Pub. No.: WO2014/180652
PCT Pub. Date: Nov. 13, 2014

(65) Prior Publication Data
US 2016/0059360 A1    Mar. 3, 2016

(30) Foreign Application Priority Data

May 8, 2013   (EP) ..................... 13166930

(51) Int. Cl.
*B23K 31/00* (2006.01)
*B23K 31/02* (2006.01)
(Continued)

(52) U.S. Cl.
CPC .............. *B23K 31/02* (2013.01); *B23K 9/044* (2013.01); *B23K 26/34* (2013.01); *B23K 26/362* (2013.01); *B23K 26/40* (2013.01); *B23P 6/00* (2013.01); *B23P 6/007* (2013.01); *C23C 10/00* (2013.01); *C23C 10/48* (2013.01); *C23C 10/50* (2013.01); *C23C 10/60* (2013.01); *B23K 2201/001* (2013.01); *B23K 2203/04* (2013.01); *B23K 2203/166* (2015.10); *B23K 2203/50* (2015.10); *B23P 2700/13* (2013.01);
(Continued)

(58) Field of Classification Search
CPC .......... B23K 2201/001; B23K 2201/34; B23K 26/32; B23K 26/322; B23K 26/342; B23K 35/004; B23P 6/007; C21D 9/50
USPC ............ 228/119; 29/402.18, 402.01, 402.11, 29/889.1; 427/320
See application file for complete search history.

(56) References Cited

U.S. PATENT DOCUMENTS 5,762,727 A * 6/1998 Crawmer ............... B23K 9/044
                                                          148/524
5,873,703 A    2/1999 Kelly et al.
(Continued)

FOREIGN PATENT DOCUMENTS

WO   WO2009036776 A1   3/2009

OTHER PUBLICATIONS

International Search Report; PCT/EP2014/058064; International Filing Date: Apr. 22, 2014; 3 Pgs.

*Primary Examiner* — Erin Saad
(74) *Attorney, Agent, or Firm* — Schmeiser Olsen & Watts LLP

(57) ABSTRACT

The welding can be carried out only after the partial removal of a necessary aluminized portion prior to welding an aluminized component.

14 Claims, 1 Drawing Sheet

(51) Int. Cl.

| | | |
|---|---|---|
| *B23K 31/10* | (2006.01) | |
| *C23C 10/48* | (2006.01) | |
| *C23C 10/50* | (2006.01) | |
| *C23C 10/60* | (2006.01) | |
| *B23K 9/04* | (2006.01) | |
| *B23P 6/00* | (2006.01) | |
| *B23K 26/34* | (2014.01) | |
| *B23K 26/36* | (2014.01) | |
| *B23K 26/40* | (2014.01) | |
| *C23C 10/00* | (2006.01) | |
| *F01D 5/00* | (2006.01) | |

(52) U.S. Cl.
CPC .......... *F01D 5/005* (2013.01); *F05B 2230/80* (2013.01); *F23R 2900/00019* (2013.01)

(56) References Cited

U.S. PATENT DOCUMENTS

| | | | |
|---|---|---|---|
| 6,302,975 B1* | 10/2001 | Kung | ........................ C23C 4/18 |
| | | | 148/525 |
| 2005/0139581 A1 | 6/2005 | Hu | |
| 2008/0028605 A1 | 2/2008 | Lutz et al. | |
| 2010/0285415 A1* | 11/2010 | Bottcher | ................. F23D 11/36 |
| | | | 431/159 |
| 2011/0167634 A1 | 7/2011 | Milleville et al. | |

* cited by examiner

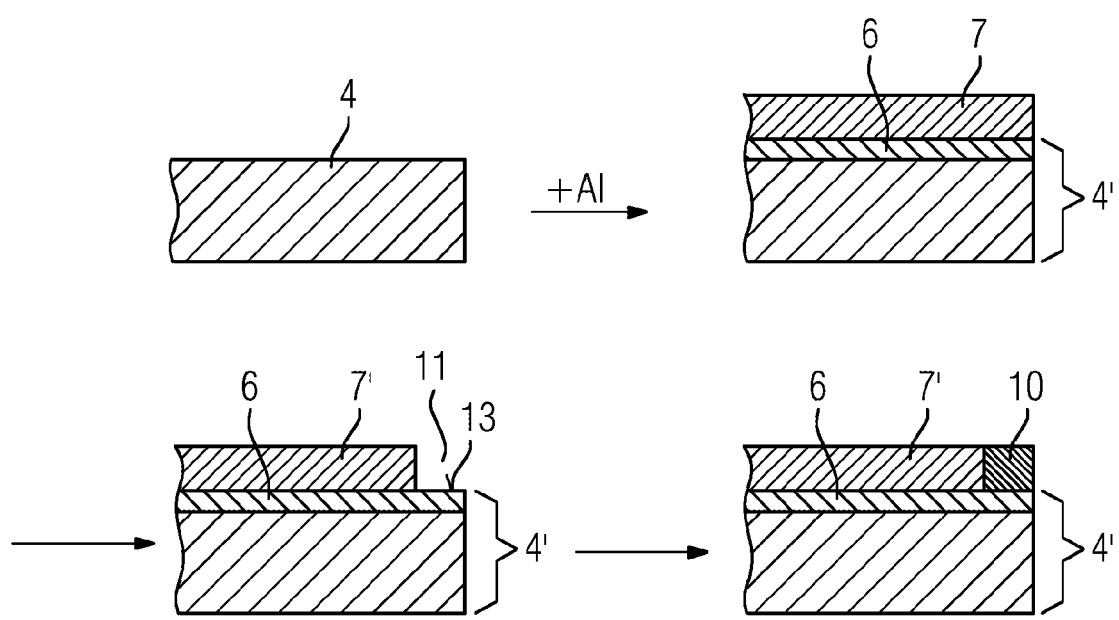

WELDING OF ALUMINIZED COMPONENTS AND AN ALUMINIZED COMPONENT

CROSS-REFERENCE TO RELATED APPLICATIONS

This application claims priority to PCT Application No. PCT/EP2014/058064, having a filing date of Apr. 22, 2014, based off of European Application No. 13166930.1 having a filing date of May 8, 2013, the entire contents of which are hereby incorporated by reference.

FIELD OF TECHNOLOGY

The following relates to the welding of aluminized components and to an aluminized component.

BACKGROUND

Gas turbine components such as burner components have steels which are aluminized in order to improve their corrosion properties.

Hitherto, such components were not repaired.

SUMMARY

An aspect relates to a method by means of which aluminized components can be repaired or welded.

By virtue of the method features and the component features, aluminized components can be welded or have an advantageous weld.

BRIEF DESCRIPTION

Some of the embodiments will be described in detail, with reference to the following figures, wherein like designations denote like members, wherein:

FIG. 1 shows schematically a sequence of an embodiment of a method and an embodiment of a component.

DETAILED DESCRIPTION

A substrate 4, in particular made of a steel, very particularly made of 16Mo3, is to be welded or repaired.

In that context, aluminized (+Al) is carried out in a first step, which produces a diffusion layer 6 within the substrate 4, converting this into a modified substrate 4', and generates a build-up layer 7.

Aluminizing can also be carried out only locally.

The diffusion layer 6 preferably has a depth of 150 μm to 300 μm.

The build-up layer 7 preferably has a thickness of 100 μm.

One part of the build-up layer 7 is in particular locally removed from the surface 13 of the diffusion layer 6 such that only a remnant 7' of the build-up layer is present, wherein the build-up layer is largely, in particular entirely, removed with respect to its thickness and thus a surface 13 of the diffusion layer 6 forms an outer surface. The local removal of the build-up layer is expedient if only part of the aluminized surface of the substrate 4' is to be welded.

In the next step, the exposed region 11 of the surface 13 is provided with a weld 10.

The procedure according to the prior art was to remove only the oxidized surface of aluminum of the build-up layer 7.

The removal of part of the build-up layer 7 can be carried out chemically and/or mechanically and/or by laser ablation.

The weld 10 can be used to weld together burner components or to build up material in order to increase wall thickness.

The repaired component has, next to one another, a substrate 4' having a diffusion layer 6 and a weld 10 on the diffusion layer 6 together with a build-up layer 7' on the surface 13 of the diffusion layer 6.

The invention claimed is:

1. A method for repairing a component having a substrate, the method comprising:
   aluminizing the substrate, which produces a diffusion layer within the substrate and generates a build-up layer on the diffusion layer;
   removing only a part of the build-up layer, such that a region of a surface of the diffusion layer is exposed and a remnant of the build-up layer remains on the diffusion layer adjacent the exposed region of the diffusion layer;
   providing a weld to the region of the diffusion layer that is exposed next to the remnant of the build-up layer; and
   retaining the remnant of the build-up layer adjacent the weld after providing the weld.

2. The method as claimed in claim 1, wherein the substrate is a steel.

3. The method as claimed in claim 1, wherein the substrate is only partially aluminized.

4. The method as claimed in claim 1, wherein the build-up layer is removed only locally from the surface.

5. The method as claimed in claim 1, wherein a material used to provide the is steel.

6. The method as claimed in claim 1, wherein the substrate of the component is aluminized prior to providing a weld.

7. A component comprising:
   an aluminized substrate, the aluminized substrate comprising a substrate that is aluminized, resulting in a diffusion layer within the aluminized substrate;
   a build-up layer disposed on the diffusion layer, the build-up layer resulting from the aluminizing of the substrate, wherein, a portion of the build-up layer is removed to retain a remnant of the build-up layer located on the diffusion layer, the removal of the portion of the build-up layer exposing a surface of the diffusion layer; and
   a weld provided on the surface of the diffusion layer that was exposed by the removal, the weld being adjacent the remnant of the build-up layer after a welding step is performed to the component.

8. The component as claimed in claim 7, wherein the substrate of the component is aluminized prior to welding.

9. The component as claimed in claim 7, which is a repaired component.

10. The component as claimed in claim 7, wherein the weld is present directly on the diffusion layer.

11. The method as claimed in claim 1, wherein the substrate is molybdenum-containing steel.

12. The method as claimed in claim 1, wherein the substrate is made of 16Mo3.

13. The method as claimed in claim 1, wherein the build-up layer is locally entirely removed.

14. The method as claimed in claim 1, wherein the build-up layer is entirely removed.

* * * * *